US 8,031,950 B2

(12) United States Patent
Cavanaugh et al.

(10) Patent No.: US 8,031,950 B2
(45) Date of Patent: *Oct. 4, 2011

(54) CATEGORIZING IMAGES OF SOFTWARE FAILURES

(75) Inventors: Ryan J. Cavanaugh, Redmond, WA (US); Eric J. Gruber, Duvall, WA (US)

(73) Assignee: Microsoft Corporation, Redmond, WA (US)

(*) Notice: Subject to any disclaimer, the term of this patent is extended or adjusted under 35 U.S.C. 154(b) by 1437 days.

This patent is subject to a terminal disclaimer.

(21) Appl. No.: 11/337,740

(22) Filed: Jan. 23, 2006

(65) Prior Publication Data

US 2007/0174816 A1    Jul. 26, 2007

(51) Int. Cl.
*G06K 9/68* (2006.01)
*G06K 9/62* (2006.01)

(52) U.S. Cl. ......... 382/219; 382/218; 382/221; 382/224

(58) Field of Classification Search .................. None
See application file for complete search history.

(56) References Cited

U.S. PATENT DOCUMENTS

| | | | | |
|---|---|---|---|---|
| 5,982,931 A * | 11/1999 | Ishimaru | ........................ | 382/218 |
| 6,226,407 B1 * | 5/2001 | Zabih et al. | ................... | 382/209 |
| 7,092,572 B2 * | 8/2006 | Huang et al. | ................... | 382/218 |
| 7,602,424 B2 * | 10/2009 | Anderson | ................ | 348/231.99 |
| 7,644,368 B2 * | 1/2010 | Pins | .............................. | 715/762 |
| 2002/0146176 A1 * | 10/2002 | Meyers | ........................ | 382/218 |
| 2003/0185462 A1 * | 10/2003 | Hsieh | ............................ | 382/286 |
| 2005/0188357 A1 * | 8/2005 | Derks et al. | ................... | 717/124 |
| 2006/0159347 A1 * | 7/2006 | Derks et al. | ................... | 382/218 |
| 2008/0282231 A1 * | 11/2008 | R et al. | ......................... | 717/127 |
| 2008/0294985 A1 * | 11/2008 | Milov | ............................ | 715/704 |
| 2008/0310736 A1 * | 12/2008 | Chattopadhyay et al. | .... | 382/218 |
| 2009/0213226 A1 * | 8/2009 | Man et al. | ..................... | 348/189 |

* cited by examiner

*Primary Examiner* — Michael J Yigdall
*Assistant Examiner* — Ben Wang (57) ABSTRACT

Software failures are processed by categorizing images associated with the failures into groups based on similarities in the images. The categorizing of the images may be performed by a software failure analysis tool. The images may include full or partial screenshots of a computer at the time of the software failure. An image may be part of the output of a test, or may be part of a report of a software failure from an end user of the software. The software failure analysis tool may be part of a larger software test management system.

16 Claims, 9 Drawing Sheets

CATEGORIZING IMAGES OF SOFTWARE FAILURES

BACKGROUND

Software testing checks whether or not software operates as intended. When software does not operate as intended, yielding unexpected results, this is due to defects in the software. The correction of these defects, and the introduction of new features or the enhancement of existing features, may introduce new defects into the software. Repeated testing improves the likelihood of catching defects soon after their introduction.

Manually testing software, by having a person operate the software, provide inputs to the software, and examine the behavior and outputs of the software, may be appropriate in certain situations because it provides immediate benefits. However, in the long run, it is tedious for the person and an inefficient use of the person's time and effort. Consequently, automated tests that are planned in advance and run without human intervention are popular, since repeated testing is performed quickly and efficiently.

A company's test designers may have created dozens and even thousands of tests for its software. These suites of tests encompass valuable knowledge of the software, user scenarios, and expected configurations. If a test results in the failure of the software, information captured from the computer up to and at the time the software failed is stored for further analysis.

The volume of software failures associated with a given test suite may be huge, even though a relatively small number of defects in the software are causing the failures. The order in which these software failures are presented to the person or people who are supposed to analyze them may bear no relation whatsoever to the causes of the failures, thus complicating the analysis.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Software failures are categorized into groups according to similarities in images associated with the software failures. For example, an image may include a full or partial screenshot of a computer at the time of the software failure. Comparing images is significantly more computationally intensive than comparing data such as numbers or data strings. Therefore, images to be categorized are compared to a single representative of a group in order to determine whether they too belong to that group.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments may be practiced without these specific details. In other instances, well-known methods, procedures and components have not been described in detail so as not to obscure the embodiments of the invention.

According to an embodiment of the invention, software failures are processed by categorizing images associated with the failures into groups based on similarities in the images. The categorizing of the images may be performed by a software failure analysis tool. The images may include full or partial screenshots of a computer at the time of the software failure. An image may be part of the output of a test, or may be part of a report of a software failure from an end user of the software.

Figure 1:
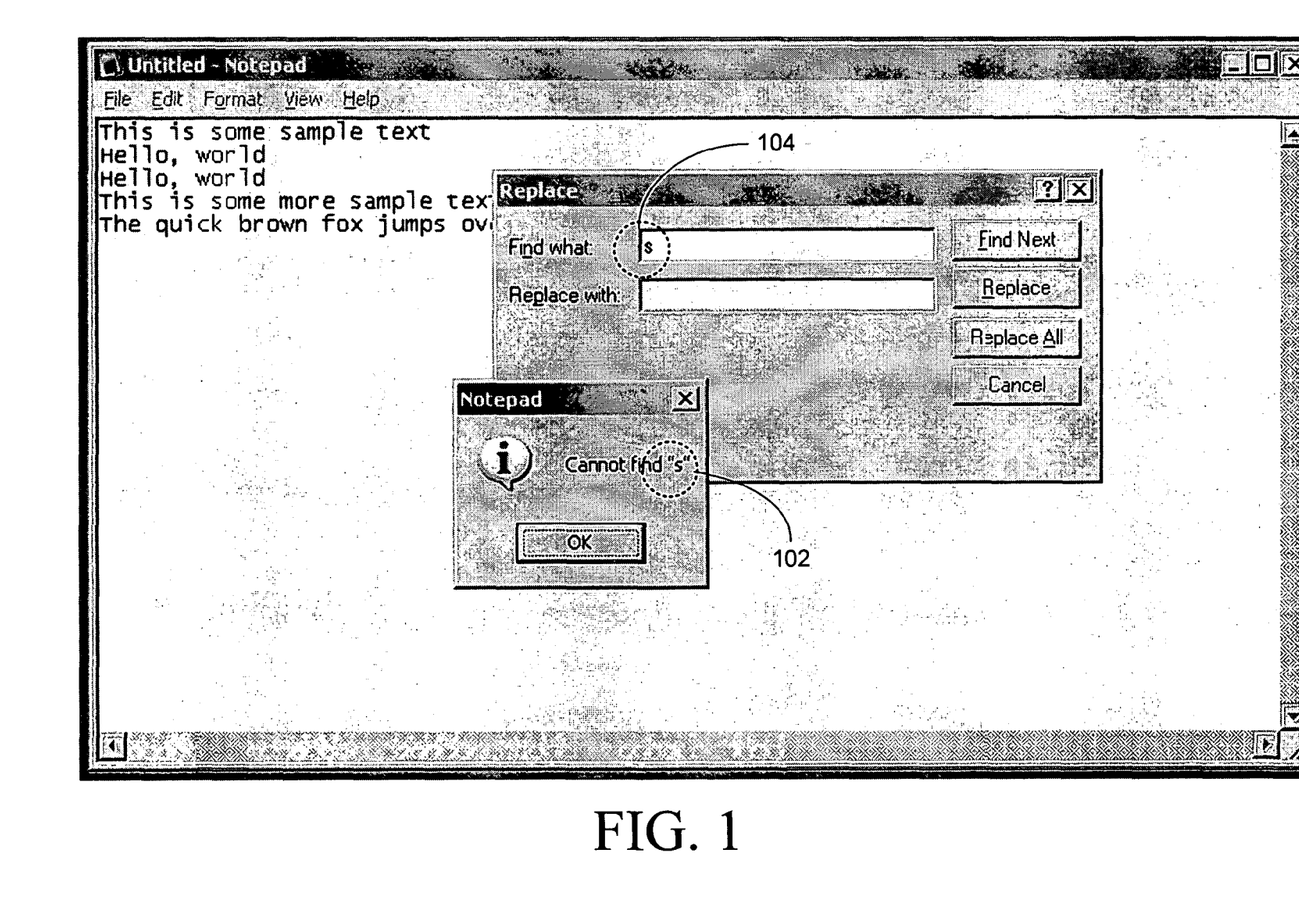
FIGS. 1 and 2 are exemplary partial screenshots showing failures of the "MICROSOFT®" Notepad software.
Figure 2:
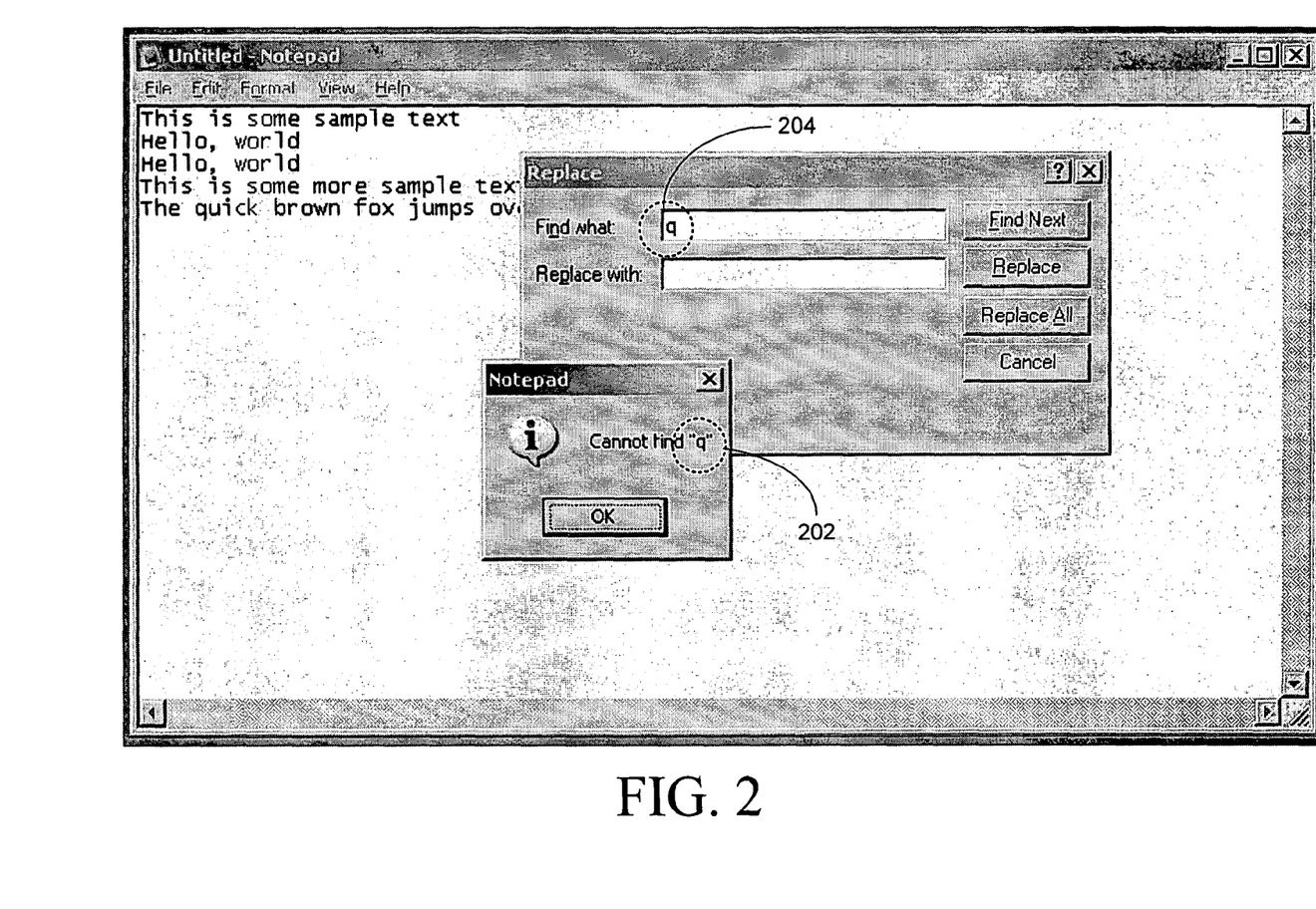

Some of the failures may be caused by the same defect in the software. In such cases, the screenshots of the failures may be very similar. For example, FIGS. 1 and 2 are exemplary partial screenshots showing failures of the "MICROSOFT®" Notepad software. A search for a particular letter ("s" in FIG. 1, "q" in FIG. 2) has failed, even though the particular letter appears in the text. It is likely that the same defect in the software is causing both failures. The screenshots of FIGS. 1 and 2 are identical except for the pixels in the vicinity of the letters "s" and "q", respectively, as indicated by dashed circles 102 and 104 in FIG. 1 and dashed circles 202 and 204 in FIG. 2.

Figure 3:
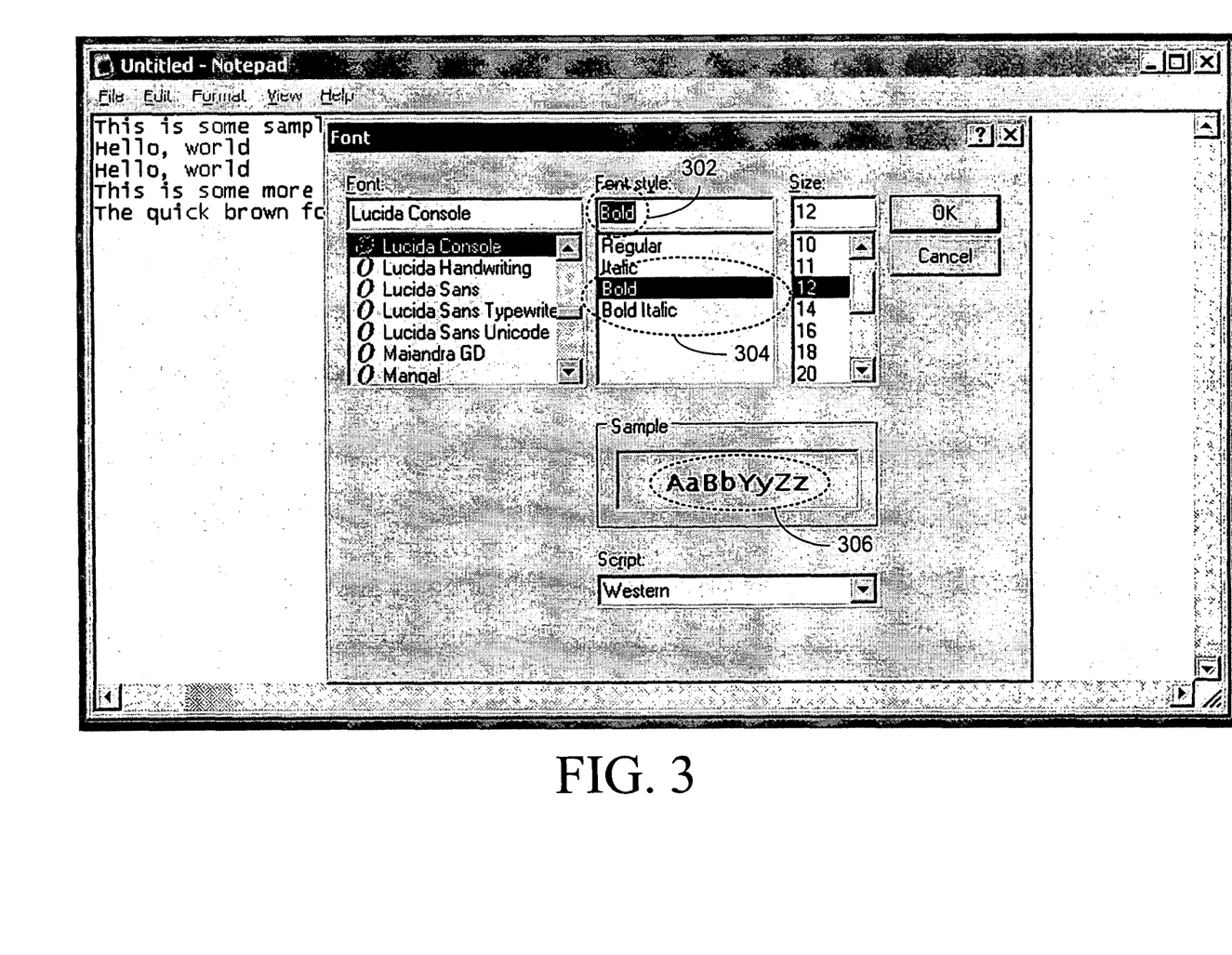
FIGS. 3 and 4 are exemplary partial screenshots showing failures of the "MICROSOFT®" Notepad software.
Figure 4:
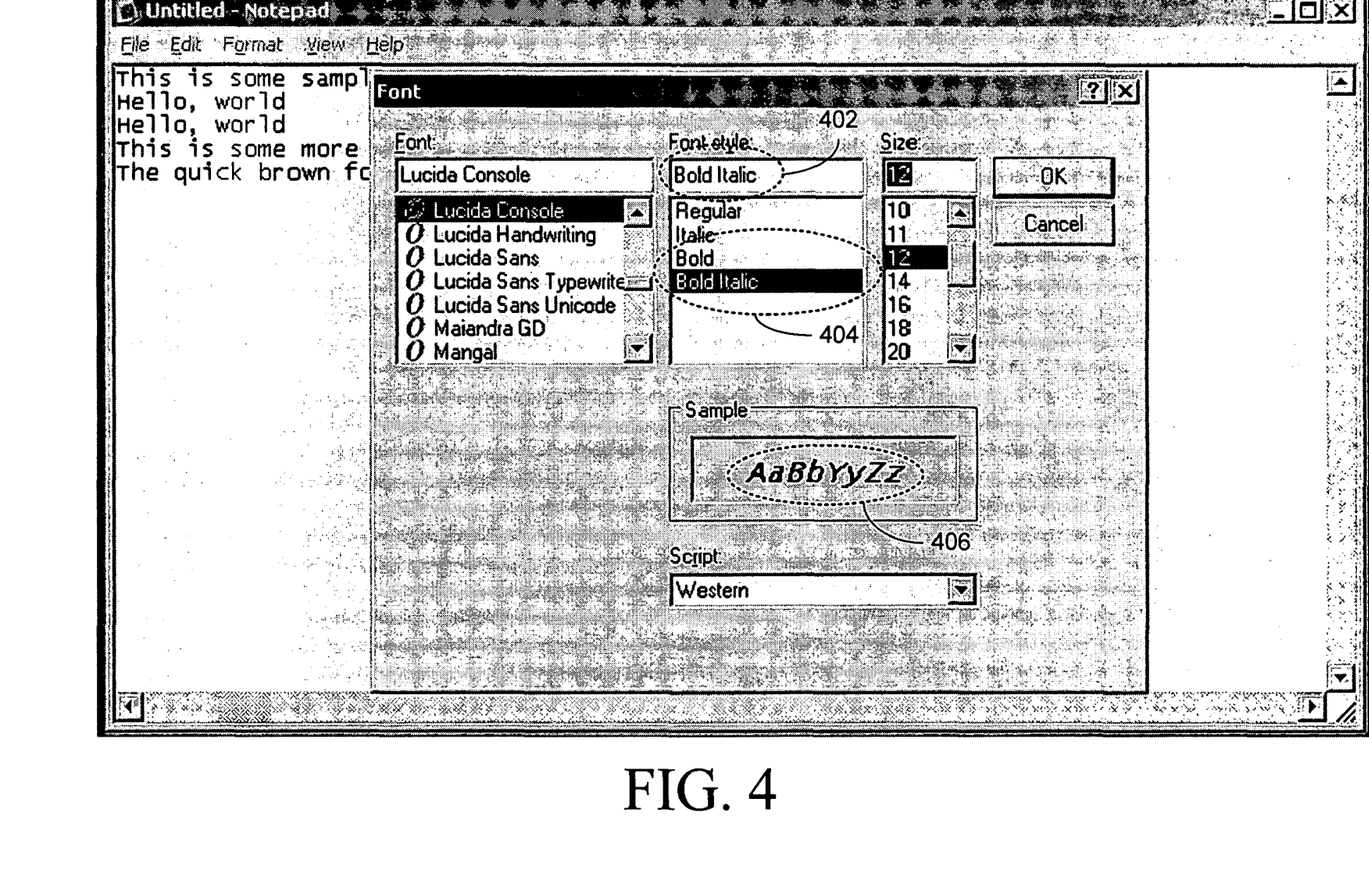

In another example, FIGS. 3 and 4 are exemplary partial screenshots showing failures of the "MICROSOFT®" Notepad software. The screenshots of FIGS. 3 and 4 are identical except for pixels in the vicinity of the "Font style" field, as indicated by dashed ovals 302 and 402 in FIGS. 3 and 4 respectively, in the vicinity of the "Font style" list, as indicated by dashed ovals 304 and 404 in FIGS. 3 and 4 respectively, and in the vicinity of the "Sample" field, as indicated by dashed ovals 306 and 406 in FIGS. 3 and 4 respectively. In this case, the software failures may be a failure to locate a desired size of font.

Figure 5:
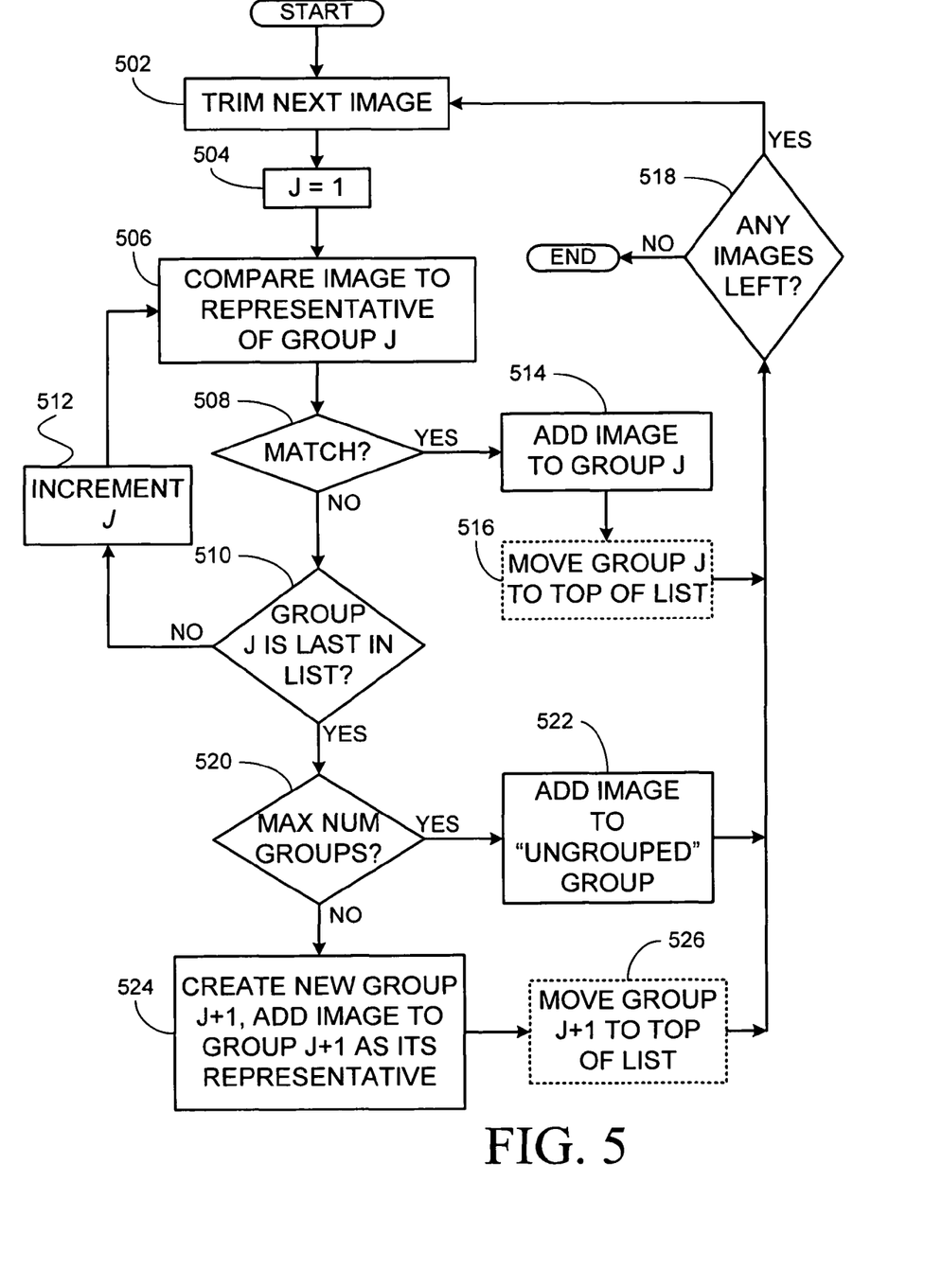
FIG. 5 is a flowchart of an exemplary method for grouping images, according to an embodiment of the invention.

FIG. 5 is a flowchart of an exemplary method for categorizing images into groups, according to an embodiment of the invention. The method of FIG. 5 assumes that there is already at least one group of one or more images. If there are no such groups, then the first image (suitably trimmed, as at 502, below) becomes the representative of group 1, and then the method begins with the next (second) image.

At 502, the image to be categorized is trimmed by a predetermined amount to remove extraneous portions, if appropriate. For example, if the images are full screenshots, the trimming may involve removing a certain number of rows of pixels from the bottom of the screenshot and a certain number of rows of pixels from the top of the screenshot. For example, removing the bottom 40 rows of pixels will remove the taskbar, which is likely the same for all screenshots from the same set of tests, and the clock, which is likely different for the different screenshots. In another example, removing the top 10 rows of pixels will remove the upper edge of any frame that is maximized to occupy the entire screen. Alternatively, all images to be categorized are trimmed prior to the categorization.

At 504, an index J of the groups is set to 1. At 506, the image being considered is compared to a representative image of group J. An exemplary method for comparing two images is described below with respect to FIG. 6.

At 508, it is checked whether the comparison of the two images has determined that the images are sufficiently similar. This is denoted a match. What constitutes "sufficiently similar" will depend upon the precise implementation of the image comparison.

If there is no match, then it is checked at 510 whether group J is the last in the list of groups. If not, then the index J is incremented by one at 512, and the method resumes from 506.

If there is a match, then at 514 the image is categorized as belonging to group J. Optionally, group J is moved to the top of the list. For example, all groups with an index K less than J are re-indexed with K+1, and the group J is re-indexed as group 1. Consequently, groups having more recent additions are compared to subsequent images before groups having less recent additions. This re-ordering of groups will result in fewer comparisons if similar images are processed consecutively rather than if similar images are processed non-consecutively.

If no more images are to be categorized (checked at 518), then the method ends. Otherwise, the method continues from 502 with the next image to be categorized.

If an image has been compared to representatives of all the groups without a match being found, then it is checked at 520 whether the maximum number of groups has been reached. If the maximum number of groups has been reached, then the unmatched image is added at 522 to a catch-all group of "ungrouped" images, and the method continues from 518.

If there are fewer groups than the maximum number (checked at 520), then at 524 a new group with index J+1 is created and the unmatched image is designated the representative of group J+1. Optionally, group J+1 is moved to the top of the list. For example, all groups with an index K less than J+1 are re-indexed with K+1, and the group J+1 is re-indexed as group 1.

The maximum number of groups, which may be fixed or configurable, may affect the performance of the method. If the maximum number is no less than the number of images to be categorized, then in the worst case of no matches, every image will be compared to every other image, which is very time intensive. In some situations, many of the images ought to be categorized into a small number of groups and the rest of the images ought to be categorized into groups of only a few images. An appropriate value for the maximum number of groups is one that will provide a satisfactory categorization of the images without requiring too much processing time.

Comparing images is significantly more computationally intensive than comparing data such as numbers or data strings. The grouping method of FIG. 5 is therefore suited to images, since images to be categorized are compared to a single representative of a group in order to determine whether they too belong to that group.

Figure 6:
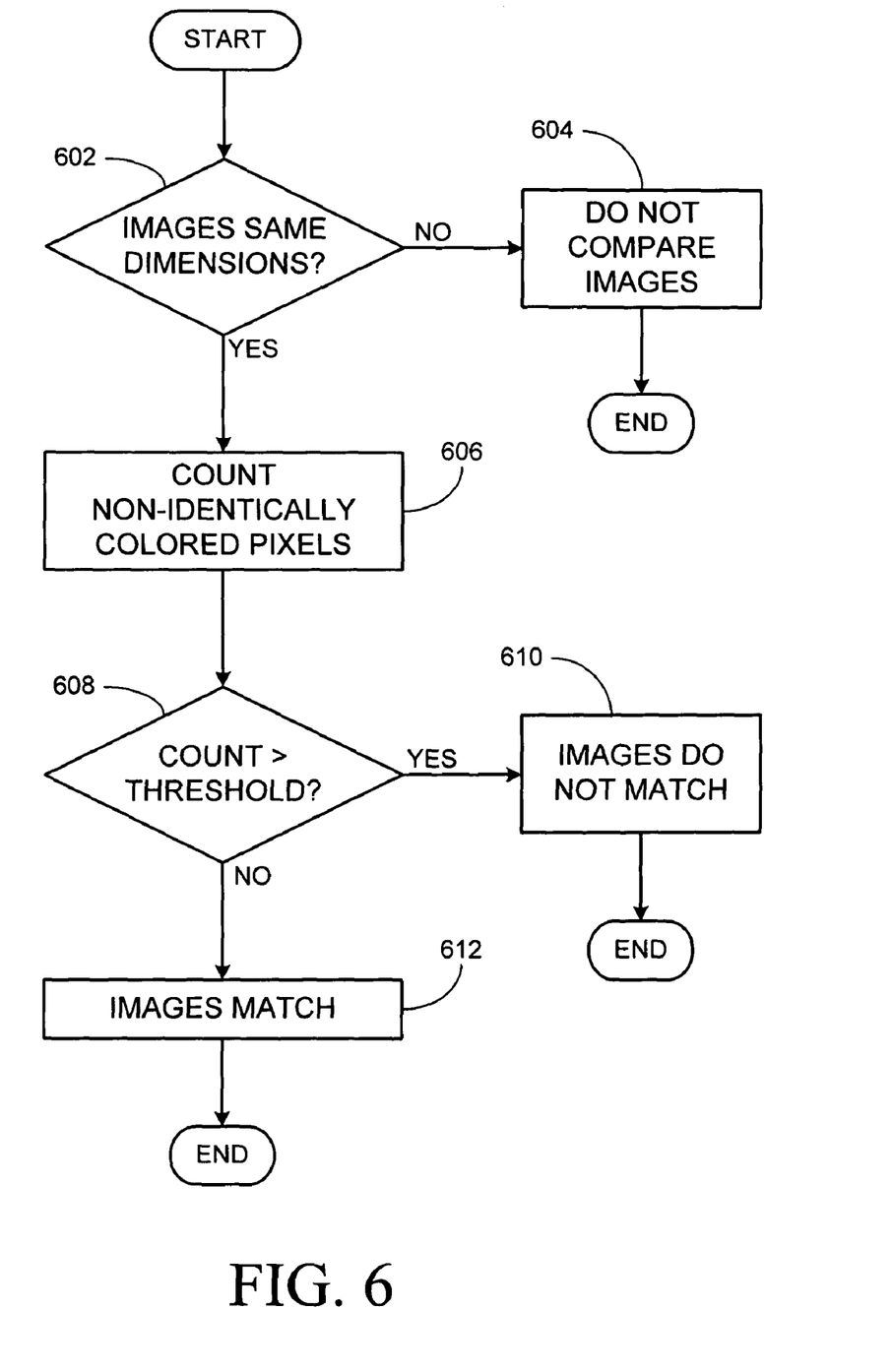
FIG. 6 is a flowchart of an exemplary method for comparing two images, according to an embodiment of the invention.

FIG. 6 is a flowchart of an exemplary method for comparing two images, according to an embodiment of the invention.

If the images are not of the same dimensions (checked at 602), then no comparison is made at 604, and the method ends.

Otherwise, a count of the non-identically colored pixels of the images is calculated at 606. For example, if the images are denoted A and B, and A[p] and B[p] are the p-th pixels of images A and B respectively, then the count C may be calculated as follows:

$$C = \sum_{p \bmod k = 0} \left( \begin{cases} 0, & \text{if } A[p] = B[p] \\ 1, & \text{otherwise} \end{cases} \right),$$

where a skip value k, which is a positive integer, determines how many of the pixels are compared.

For example, if k is 1 every pixel in image A is compared to its corresponding pixel in image B, if k is 2 every other pixel in image A is compared to its corresponding pixel in image B, and so on. Lower values of k provide greater resolution but require more computing power/time for the comparison of the two images than higher values of k. Other implementations of skip value k are also contemplated. For example, if k is 2, the pixels of every other column in image A could be compared to their corresponding pixels in image B, or the pixels of every other row in image A could be compared to their corresponding pixels in image B, or a checkerboard-style pattern of pixels in image A could be compared to their corresponding pixels in image B.

At 608, the count C is compared to a pixel difference threshold. For example, to set the threshold at 20% of the pixels being different, the threshold may be set to 1000×700× 0.2 for a screen resolution of 1000 by 700 pixels where each pixel is compared. If the pixel difference threshold is set too low, then similar images will not be grouped together. If the pixel difference threshold is set too high, then dissimilar images will be grouped together.

If the count C exceeds the pixel difference threshold, i.e. if the number of compared pixels that are not identically colored exceeds the threshold, then at 610 it is concluded that the images are not sufficiently similar (i.e. do not match), and the method ends. Otherwise, it is concluded at 612 that the images are sufficiently similar (i.e. match), and the method ends.

Figure 7:
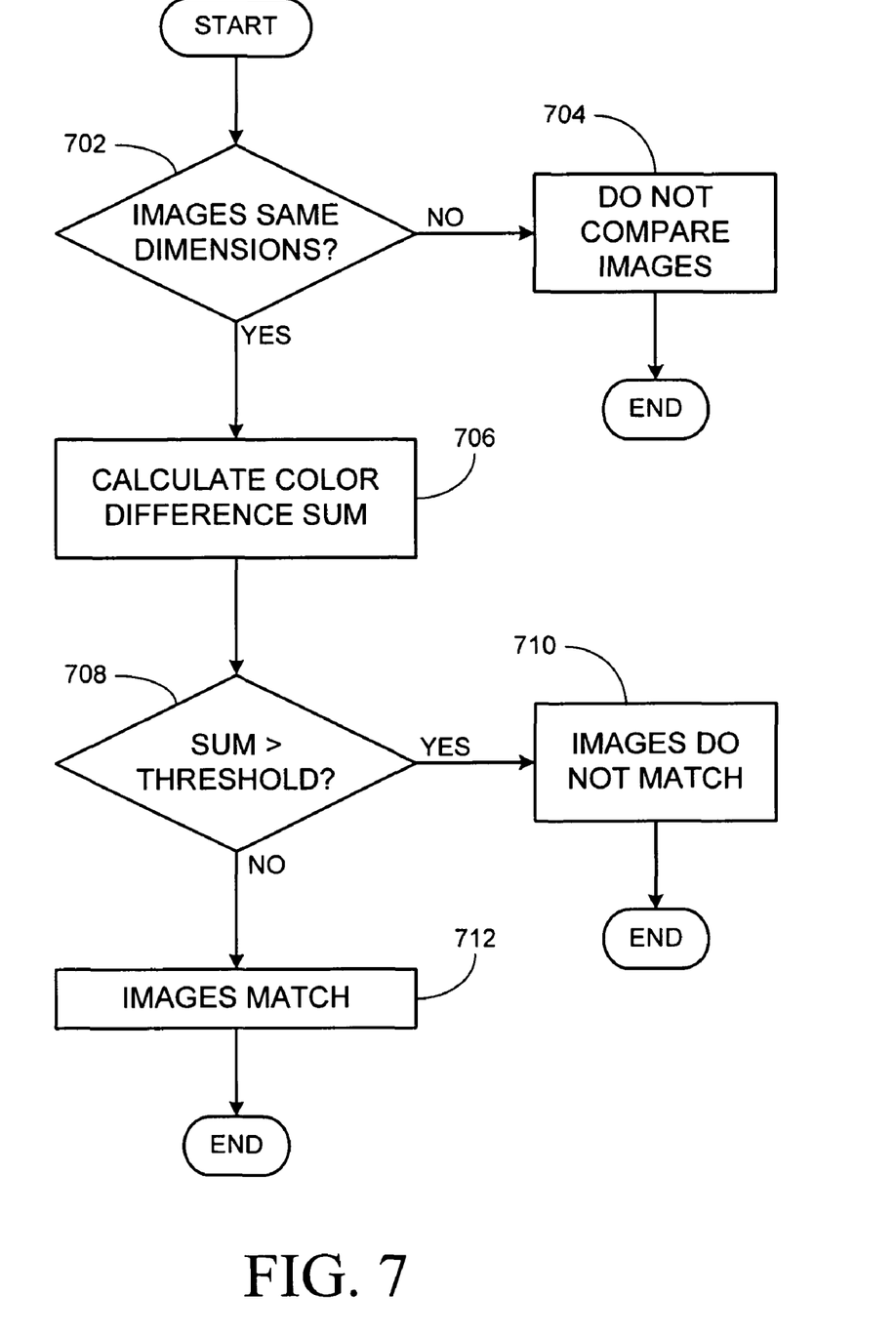
FIG. 7 is a flowchart of an exemplary method for comparing two images, according to another embodiment of the invention.

FIG. 7 is a flowchart of an exemplary method for comparing two images, according to another embodiment of the invention.

If the images are not of the same dimensions (checked at 702), then at 704 it is determined not to compare the images, and the method ends.

Otherwise, a color difference sum S is calculated at 706. For example, if $A[p]_R$, $A[p]_B$, $A[p]_G$ and $B[p]_R$, $B[p]_B$, $B[p]_G$ are the red, blue and green channel values (between 0 and 255) of the p-th pixel of images A and B respectively, then the sum S may be calculated as follows:

$$S = \sum_{p \bmod k = 0} \left( |A[p]_R - B[p]_R| + |A[p]_B - B[p]_B| + |A[p]_G - B[p]_G| \right).$$

At 708, the sum S is compared to a color difference threshold. A color threshold value might be (1024×768×(256+256+256)×0.2), meaning a 20% total difference across all three color channels.

If the sum S exceeds the color difference threshold, then at 710 it is concluded that the images are not sufficiently similar (i.e. do not match), and the method ends. Otherwise, it is concluded at 712 that the images are sufficiently similar (i.e. match), and the method ends.

Alternative methods for image comparison are also contemplated. For example, an image comparison function that works on more general characteristics such as a color histogram could be used.

Some embodiments of the invention may be described in the general context of computer-executable instructions, such as program modules, executed by one or more computers or other devices. Generally, program modules include routines, programs, functions, dynamic linked libraries (DLLs), applets, native instructions, objects, components, data structures, etc. that perform particular tasks or implement particular abstract data types. Typically the functionality of the program modules may be combined or distributed as desired in various embodiments.

Figure 8:
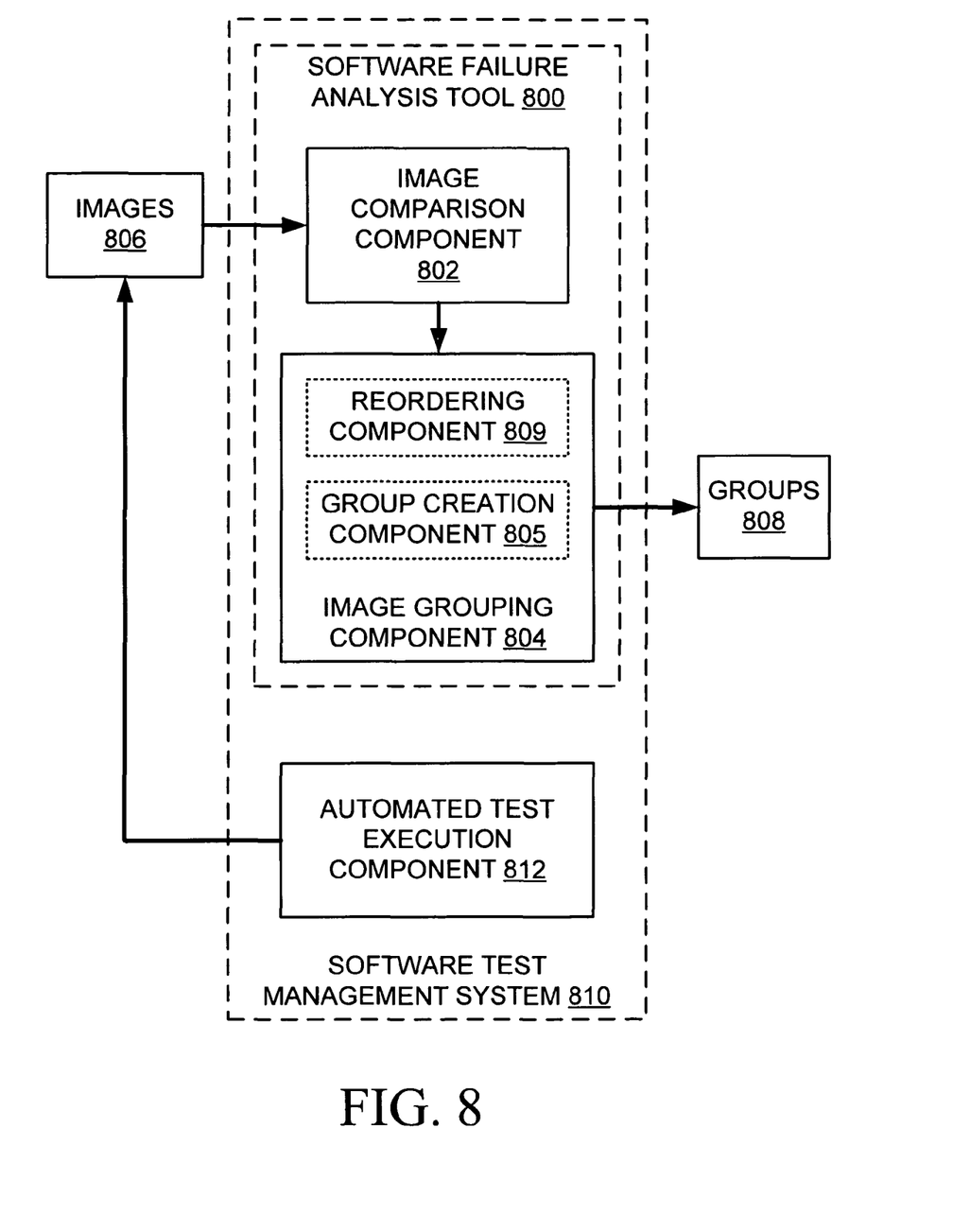
FIG. 8 is a block diagram of an exemplary software failure analysis tool, according to some embodiments of the invention.

FIG. 8 is a block diagram of an exemplary software failure analysis tool, according to some embodiments of the invention. A software failure analysis tool 800 includes an image comparison component 802 that is able to determine whether two images are sufficiently similar, and an image grouping component 804 that categorizes images 806 associated with software failures into groups 808 based on similarities in the images. Image grouping component 804 includes a group creation component 805 to create new groups as discussed above. Image grouping component 804 optionally includes a group reordering component 809 that is able to reorder the groups so that the next image to be categorized is compared to a representative of the group that has most recently had an image categorized as belonging thereto. Image comparison component 802 includes code that implements the method of FIG. 5 or any other suitable method, and image grouping component 804 includes code that implements the method of FIG. 6 or FIG. 7 or any other suitable method. A non-exhaustive list of examples for the format of the code includes interpretable code, uncompiled computer instructions, compiled computer-executable instructions, compiled objects, and the like.

Software failure analysis tool 800 may be part of a larger software test management program 810. Software test management program 810 may include an automated test execution component 812 that produces images 806 while executing tests of the software. Several software test management programs are commercially available.

Figure 9:
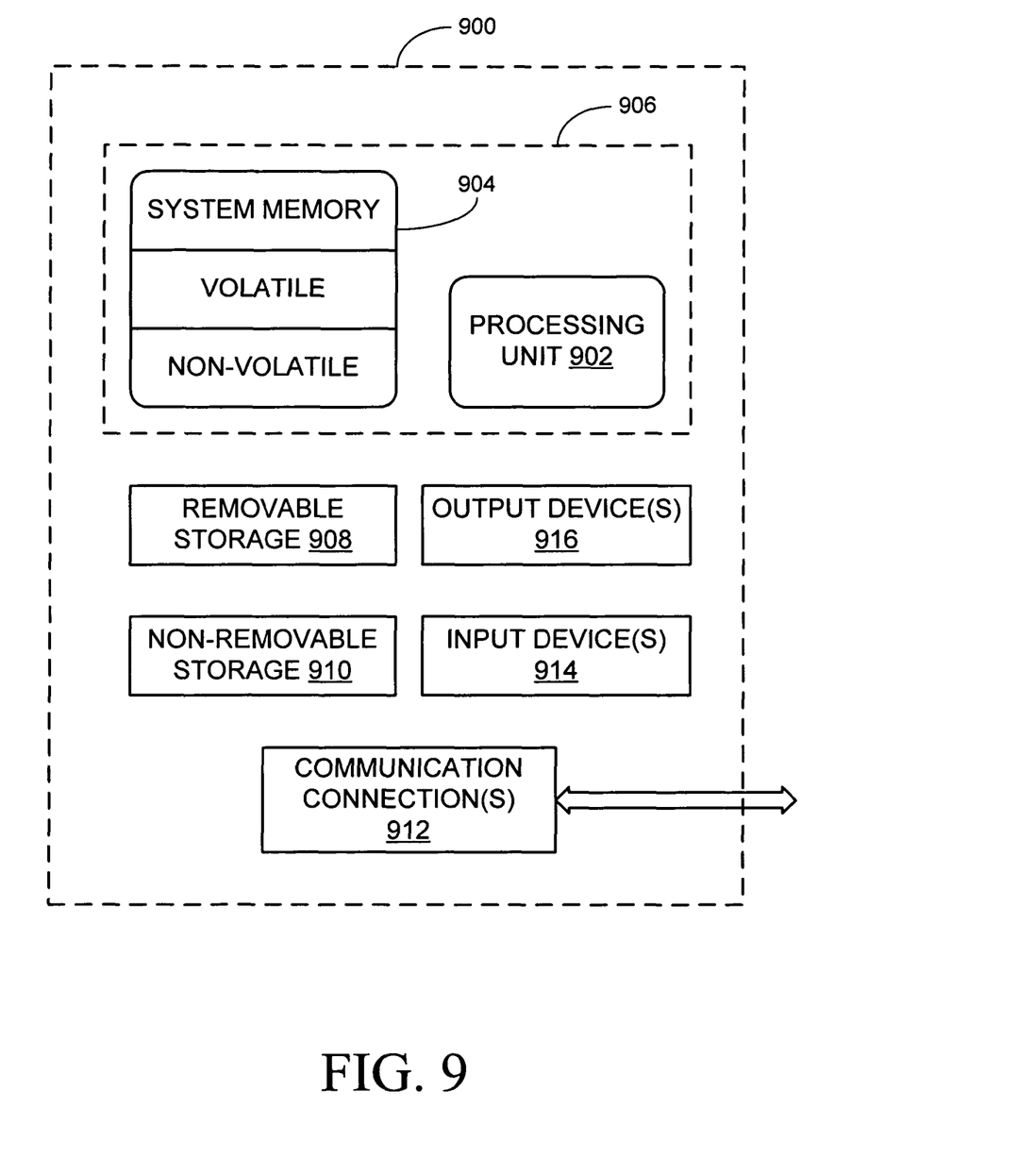
FIG. 9 illustrates an exemplary system for implementing embodiments of the invention, the system including one or more computing devices.

FIG. 9 illustrates an exemplary system for implementing embodiments of the invention, the system including one or more computing devices, such as computing device 900. In its most basic configuration, device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.) or some combination of the two. This most basic configuration is illustrated in FIG. 9 by dashed line 906.

Additionally, device 900 may also have additional features or functionality. For example, device 900 may also include additional storage (removable and/or non-removable) including, but not limited to, magnetic or optical disks or tape. Such additional storage is illustrated in FIG. 9 by removable storage 908 and non-removable storage 910.

Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900.

Device 900 may also contain communication connection(s) 912 that allow the device to communicate with other devices. Communication connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The term computer readable media as used herein includes both storage media and communication media.

Device 900 may also have input device(s) 914 such as keyboard, mouse, pen, voice input device, touch input device, etc. Output device(s) 916 such as a display, speakers, printer, etc. may also be included. All these devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing software failures, the method comprising:
   identifying a single representative image for each of a plurality of software failure groups, each software failure group representing a different defect associated with software and comprising a plurality of images generated by one or more computers at a time of failure of said software;
   categorizing a particular additional image as belonging to a specific software failure group if said particular additional image matches said representative image of said specific software failure group; and
   categorizing said particular additional image as belonging to a new software failure group with said particular additional image as its representative image if said particular additional image does not match representative images of any of said software failure groups;

wherein said particular image is determined to match or not match a representative image of a software failure group based on at least one measure of similarity between said particular additional image and said representative image of said software failure group.

2. The method of claim 1, further comprising:
if said particular additional image is categorized as belonging to said specific software failure group, reordering said software failure groups so that a next additional image to be categorized is compared first to said representative image of said specific software failure group.

3. The method of claim 1, wherein categorizing said particular additional image as belonging to a new software failure group with said particular additional image as its representative image if said particular additional image does not match representative images of any of said software failure groups includes:
categorizing said particular additional image as belonging to a new software failure group with said particular additional image as its representative image if said particular additional image does not match representative images of any of said software failure groups and if a number of said software failure groups is less than a maximum number.

4. The method of claim 3, further comprising:
if said particular additional image is categorized as belonging to said new software failure group, reordering said software failure groups so that a next additional image to be categorized is compared first to said particular additional image.

5. The method of claim 1, further comprising:
determining if said particular additional image matches a representative image of a specific software failure group by:
calculating a count of every k-th pixel in said particular additional image that differs from its corresponding pixel in said representative image;
determining that said particular additional image does not match said representative image if said count exceeds a pixel difference threshold; and
determining that said particular additional image matches said representative image if said count does not exceed said pixel difference threshold, wherein k is a positive integer.

6. The method of claim 1, further comprising:
determining if said particular additional image matches a representative image of a specific software failure group by:
calculating a sum of absolute color differences of every k-th pixel in said particular additional image and its corresponding pixel in said representative image;
determining that said particular additional image does not match said representative image if said sum exceeds a color difference threshold; and
determining that said particular additional image matches said representative image if said sum does not exceed said threshold, wherein k is a positive integer.

7. The method of claim 1, wherein said images are full or partial screenshots taken at said times of failure of said software.

8. A computer-readable storage device having computer-executable components recorded thereon comprising:
an image grouping component to identify a single representative image for each of a plurality of software failure groups, each software failure group representing a different defect associated with software and comprising a plurality of images generated by one or more computers at a time of failure of said software, to categorize a particular additional image as belonging to a specific software failure group if said particular additional image matches said representative image of said specific software failure group, and to categorize said particular additional image as belonging to a new software failure group with said particular additional image as its representative image if said particular additional image does not match representative images of any of said software failure groups; and
an image comparison component to determine if said particular image matches a representative image of a software failure group based on at least one measure of similarity between said particular additional image and said representative image of said software failure group.

9. The computer-readable storage device of claim 8, wherein said image grouping component comprises a component to reorder said software failure groups so that a next additional image to be categorized is compared first to a representative image of a software failure group that most recently had an additional image categorized as belonging thereto.

10. The computer-readable storage device of claim 8, wherein said image grouping component comprises a component to categorize said particular additional image as belonging to a new software failure group with said particular additional image as its representative image if said particular additional image does not match representative images of any of said software failure groups and if a number of said software failure groups is less than a maximum number.

11. The computer-readable storage device of claim 8, wherein said image comparison component is to determine if a first image matches a second image by:
calculating a count of every k-th pixel in said first image that differs from its corresponding pixel in said second image;
determining that said first image does not match said second image if said count exceeds a pixel difference threshold; and
determining that said first image matches said second image if said count does not exceed said threshold, wherein k is a positive integer.

12. The computer-readable storage device of claim 8, wherein said image comparison component is to determine if a first image matches a second image by:
calculating a sum of absolute color differences of every k-th pixel in said first image and its corresponding pixel in said second image;
determining that said first image does not match said second image if said sum exceeds a color difference threshold; and
determining that said first image matches said second image if said sum does not exceed said threshold, wherein k is a positive integer.

13. The computer-readable storage device of claim 8, wherein said images are full or partial screenshots taken at said times of failure of said software.

14. A software test management system comprising:
at least one processing unit; and
a memory that stores:
an automated test execution component that is executed by said at least one processing unit to execute tests of software; and
a software failure analysis tool that is executed by said at least one processing unit to identify a representative image for each of a plurality of software failure groups, each software failure group representing a different defect associated with said software and comprising a plurality of images generated by said automated test execution component at a time of failure of said software, to categorize a particular additional image as belonging to a particular software failure group if said particular additional image matches said representative image of said specific software failure group, and to categorize said particular additional image as belonging to a new software failure group with said particular additional image as its representative image if said particular additional image does not match representative images of any of said software failure groups, wherein said particular image is determined to match or not match a representative image of a software failure group based on at least one measure of similarity between said particular additional image and said representative image of said software failure group.

15. The software test management system of claim 14, wherein said software failure analysis tool is executed by said at least one processing unit to reorder said software failure groups so that a next additional image to be categorized is compared first to a representative image of a software failure group that most recently had an additional image categorized as belonging thereto.

16. The software test management system of claim 14, wherein said images are full or partial screenshots taken at said times of failure of said software.

* * * * *